United States Patent
Schopp et al.

(10) Patent No.: US 8,140,817 B2
(45) Date of Patent: Mar. 20, 2012

(54) DYNAMIC LOGICAL PARTITION MANAGEMENT FOR NUMA MACHINES AND CLUSTERS

(75) Inventors: Joel H. Schopp, Austin, TX (US); Jacob L. Moilanen, Austin, TX (US); Nathan D. Fontenot, Georgetown, TX (US); Michael T. Strosaker, Austin, TX (US); Manish Ahuja, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 12/391,827

(22) Filed: Feb. 24, 2009

(65) Prior Publication Data

US 2010/0217949 A1    Aug. 26, 2010

(51) Int. Cl.
*G06F 13/14*    (2006.01)

(52) U.S. Cl. .................... 711/173; 711/147; 710/260

(58) Field of Classification Search .................. None
See application file for complete search history.

(56) References Cited

U.S. PATENT DOCUMENTS

| | | | |
|---|---|---|---|
| 6,075,938 A | 6/2000 | Bugnion et al. | |
| 6,148,361 A | 11/2000 | Carpenter et al. | |
| 6,226,734 B1 | 5/2001 | Kleinsorge et al. | |
| 6,334,177 B1 | 12/2001 | Baumgartner et al. | |
| 6,754,776 B2 * | 6/2004 | Conway et al. | 711/129 |
| 7,065,763 B1 * | 6/2006 | Martin et al. | 718/102 |
| 7,096,469 B1 | 8/2006 | Kubala et al. | |
| 7,159,079 B2 | 1/2007 | Sukegawa | |
| 2005/0021913 A1 | 1/2005 | Heller | |
| 2008/0028179 A1 | 1/2008 | Mannarswamy et al. | |
| 2008/0149844 A1 * | 6/2008 | Chen et al. | 250/370.13 |
| 2008/0172672 A1 | 7/2008 | Logan et al. | |
| 2008/0184275 A1 | 7/2008 | Hughes et al. | |

OTHER PUBLICATIONS

Brock et al, "Experience with ubilding a commodity Intel-based ccNUMA system" IBM Journal of Research and Development, Mar. 2001, col. 25, No. 2, pp. 202-227.*

Brock et al., "Experience with building a commodity Intel-based ccNUMA system," IBM Journal of Research and Development, Mar. 2001, vol. 45, No. 2, pp. 207-227.

Jann et al., "Dynamic reconfiguration: Basic building blocks for autonomic computing on IBM pSeries servers," IBM Systems Journal, 2003, vol. 42, No. 1, pp. 29-37.

* cited by examiner

Primary Examiner — Than Nguyen
(74) Attorney, Agent, or Firm — Walter W. Duft

(57) ABSTRACT

A partitioned NUMA machine is managed to dynamically transform its partition layout state based on NUMA considerations. The NUMA machine includes two or more NUMA nodes that are operatively interconnected by one or more internodal communication links. Each node includes one or more CPUs and associated memory circuitry. Two or more logical partitions each comprise at a CPU and memory circuit allocation on at least one NUMA node. Each partition respectively runs at least one associated data processing application. The partitions are dynamically managed at runtime to transform the distributed data processing machine from a first partition layout state to a second partition layout state that is optimized for the data processing applications according to whether a given partition will most efficiently execute within a single NUMA node or by spanning across a node boundary. The optimization is based on access latency and bandwidth in the NUMA machine.

20 Claims, 13 Drawing Sheets

DYNAMIC LOGICAL PARTITION MANAGEMENT FOR NUMA MACHINES AND CLUSTERS

BACKGROUND OF THE INVENTION

1. Field of the Invention

This invention relates to the configuration and operation of logically partitioned computational machines. More particularly, the invention is directed to dynamic logical partitioning for NUMA machines and clusters.

2. Description of the Prior Art

By way of background, a logically partitioned computational machine allows system resources such as CPUs, memory and input/output (I/O) hardware to be assigned to one or more logical partitions or containers. In modern dynamically partitioned machine environments, partitions can be reconfigured without having to reboot, allowing CPU, memory and I/O resources to be added to, deleted from, or moved between running partitions. Dynamic logical partitioning has been implemented in NUMA (NonUniform Memory Access) machines wherein interconnected NUMA hardware nodes share memory and I/O resources. Partitions may be contained within single nodes or may span across several nodes, depending on configuration requirements. However, there can be performance differences depending on whether a partition crosses NUMA node boundaries. Multi-node partitions may experience increased latency for remote memory and I/O accesses that require internodal communication, whereas single-node partitions may suffer from local bandwidth congestion on local memory and I/O busses.

SUMMARY OF THE INVENTION

An apparatus, method and computer program product are provided for dynamically transforming a partition layout state in a partitioned NUMA machine based on NUMA considerations. The NUMA machine comprises a set of two or more operatively interconnected NUMA nodes, each of which includes one or more CPUs and associated memory circuitry. The NUMA nodes are operatively interconnected by one or more internodal communication links such that the CPU(s) on each node can access the memory circuitry on the other node(s). The NUMA machine is partitioned to provide two or more logical partitions that each comprise an allocation of CPU resources and memory circuit resources on at least one of the NUMA nodes. Each partition respectively runs at least one associated data processing application. Monitoring is performed to determine the latency and bandwidth associated with accesses by the partition CPU resources to the partition memory circuit resources, including local accesses within the NUMA nodes and remote accesses between the NUMA nodes on the internodal communication links. The partitions are dynamically managed at runtime based on the latency and bandwidth monitoring to transform the distributed data processing machine from a first partition layout state to a second partition layout state that is optimized for the data processing applications running on the partitions according to whether a given partition will most efficiently execute within a single NUMA node or by spanning across one or more NUMA node boundaries.

BRIEF DESCRIPTION OF THE DRAWINGS

The foregoing and other features and advantages of the invention will be apparent from the following more particular description of example embodiments, as illustrated in the accompanying Drawings, in which.

DETAILED DESCRIPTION OF THE PREFERRED EMBODIMENTS

Figure 1:
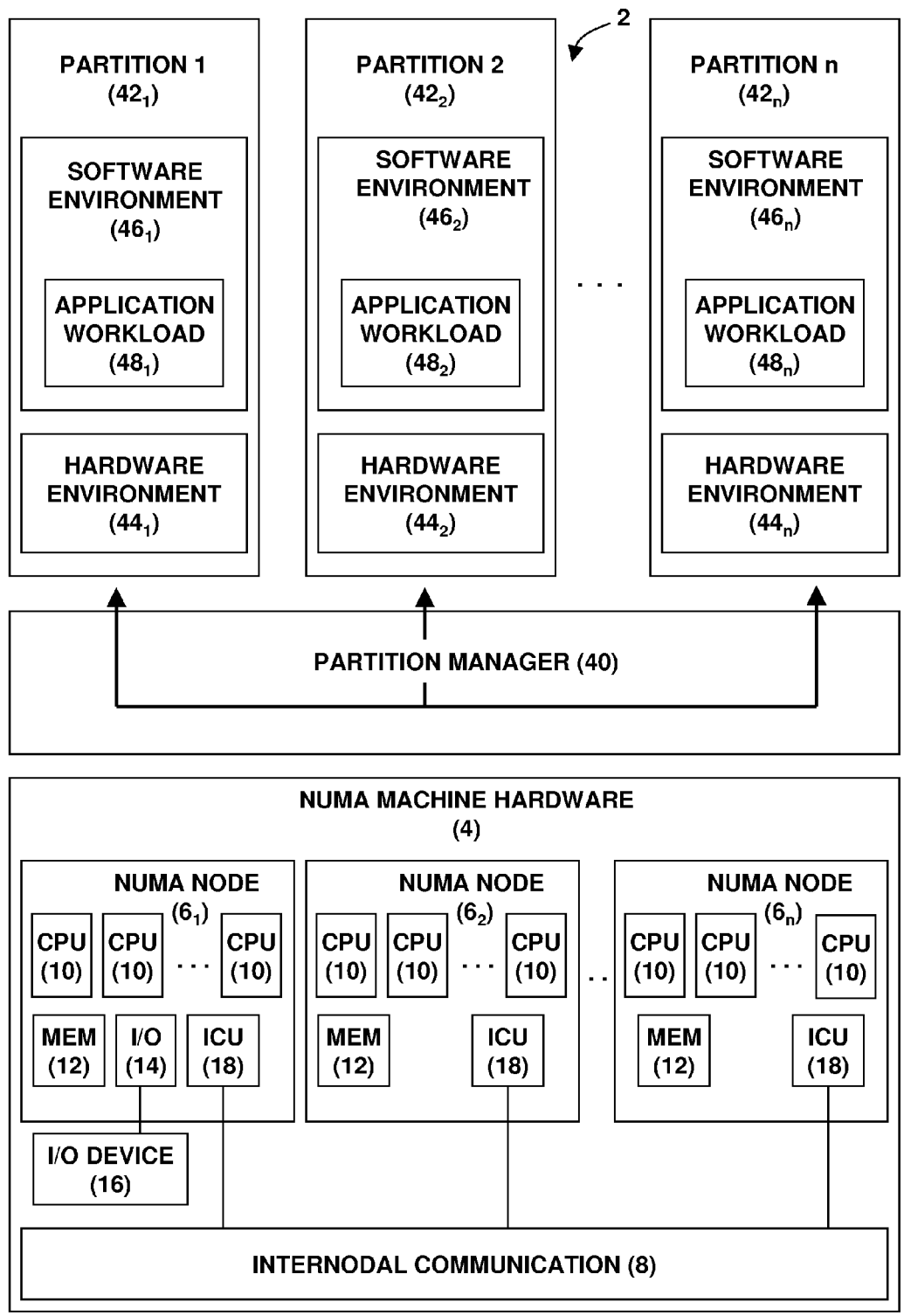
FIG. 1 is a functional block diagram showing an example data NUMA machine comprising NUMA machine hardware that is logically partitioned.

Embodiments of the invention will now be described by way of example constructions and configurations shown by the drawing figures, in which like reference numerals indicate like elements in all of the several views.

Turning to FIG. 1, a dynamic logically partitioned NUMA (NonUniform Memory Access) machine 2 may be built using a plurality of data processing system components that collectively provide the hardware 4 of the NUMA machine. The NUMA machine hardware 4 comprises a set of two or more NUMA nodes 6 (shown individually as nodes $6_1, 6_2 \ldots 6_n$) that interoperate across an internodal communication system 8 comprising one or more (depending on the number of NUMA nodes) internodal communication links. The internodal communication system 8 may be implemented using any suitable electrical, optical or wireless technology, and may comprise any number of topologies, from dedicated point-to-point connections, to single switch implementations (e.g., using a cross-bar switch), to packet or circuit switched networks of varying complexity, or to combinations thereof.

Each NUMA node 6 contains one or more CPUs (Central Processing Units) 10 and associated memory circuitry 12. Some of the NUMA nodes, such as node $6_1$, may further contain at least one input/output (I/O) controller 14 and one or more I/O device resources 16. The I/O controller 14 may be implemented in conventional fashion as part of a circuit board chipset. For example, the I/O controller 14 may comprise a conventional South bridge or I/O hub controller for interconnecting the I/O resources 16 to the CPUs 10. Example I/O resources 16 include, but are not limited to, disk drives, tape drives, other storage devices, storage systems and storage subsystems, network links, USB devices, printers, keyboard and mouse input devices, and output devices such as display monitors.

Each NUMA node 6 further contains a nodal interconnect unit (ICU) 18 that interfaces the nodes to the internodal communication system 8. As described in more detail below, the interconnect unit 18 may be implemented using conventionally available circuitry for communicating information between nodes.

The NUMA machine hardware 4 allows each CPU 10 of each NUMA node 6 to access the memory 12 (and optionally the I/O resources 16) of other NUMA nodes using a single shared address space. As such, the memory 12 and the I/O resources 16 may be thought of as examples of shared addressable hardware resources that are shared between the nodes 6. Conventional hardware and/or software support may be provided for maintaining memory coherence between the NUMA nodes 6. The ability to perform both local and remote memory and I/O accesses imbues the NUMA machine hardware 4 with nonuniform memory access characteristics, assuming there are latency differences between the local and remote accesses. Generally speaking, any shared memory data processing system (or distributed shared memory system) exhibiting differential local and remote memory and I/O access latencies may be considered to have nonuniform memory access characteristics for purposes of the present disclosure. The actual latency differences may be quite small (even negligible), or they may vary by orders of magnitude. This will depend on the circuit components used to implement the NUMA machine architecture, and will also be affected by the NUMA machine topology and the distances between NUMA nodes, which could range from inches to thousands of miles.

Figure 2:
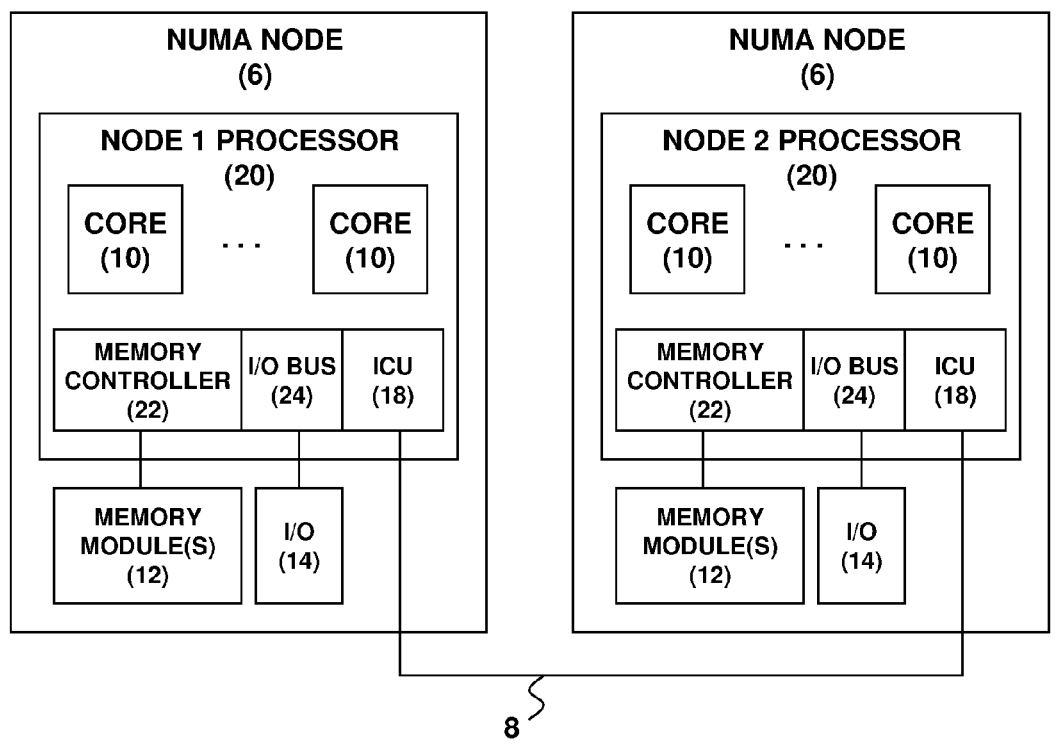
FIG. 2 is a functional block diagram showing one example configuration of the NUMA machine hardware of FIG. 1.

FIG. 2 illustrates one example of a localized configuration of the NUMA machine hardware 4. In this configuration, two NUMA nodes 6 are each constructed as a circuit board that mounts a single processor 20 and a set of one or more memory modules (e.g., DIMM modules) that provide the node local memory circuitry 12. Each processor 20 has single or multiple cores. Each CPU 10 shown in FIG. 1 is represented in FIG. 2 as a processing core of one of the processors 20. The circuit boards that mount each node's processor 20 and memory modules 12 may be located within a single server, or they may respectively reside in separate servers that are interconnected. A memory controller 22 may be integrated with each processor 20 and connected to the cores by an integrated memory bus (a.k.a. processor bus) (not shown). The interconnect port 18 of each NUMA node 6 is also shown as being integrated with the node processor 20 and is likewise connected to the memory bus. Examples of on-processor internodal communication circuits include, but are not limited to, the fabric bus controller of the IBM® POWER6™processor used in the IBM® System p® server product line. The Intel® Quickpath interconnect architecture and the AMD® Hypertransport® architecture also provide on-processor internodal communication. The three foregoing technologies would respectively support an internodal communication system 8 comprising IBM® POWER6™ processor fabric links, Intel® Quickpath links, or AMD® Hypertransport® links for interconnecting the NUMA nodes 6. If the NUMA nodes 6 are situated on different servers, the internodal communication system 8 could also include conventional interserver cabling. The I/O controller 14 (shown by way of example on both of the nodes 6 in FIG. 2) may be mounted on the node circuit board and connected to an on-processor I/O interface 24 connected to the memory bus. The I/O controller 14 may be attached directly to the I/O interface 24 or indirectly via an additional (e.g., higher speed) controller or hub (not shown). The I/O interface controller 14 could also be integrated with the processor 20.

Figure 3:
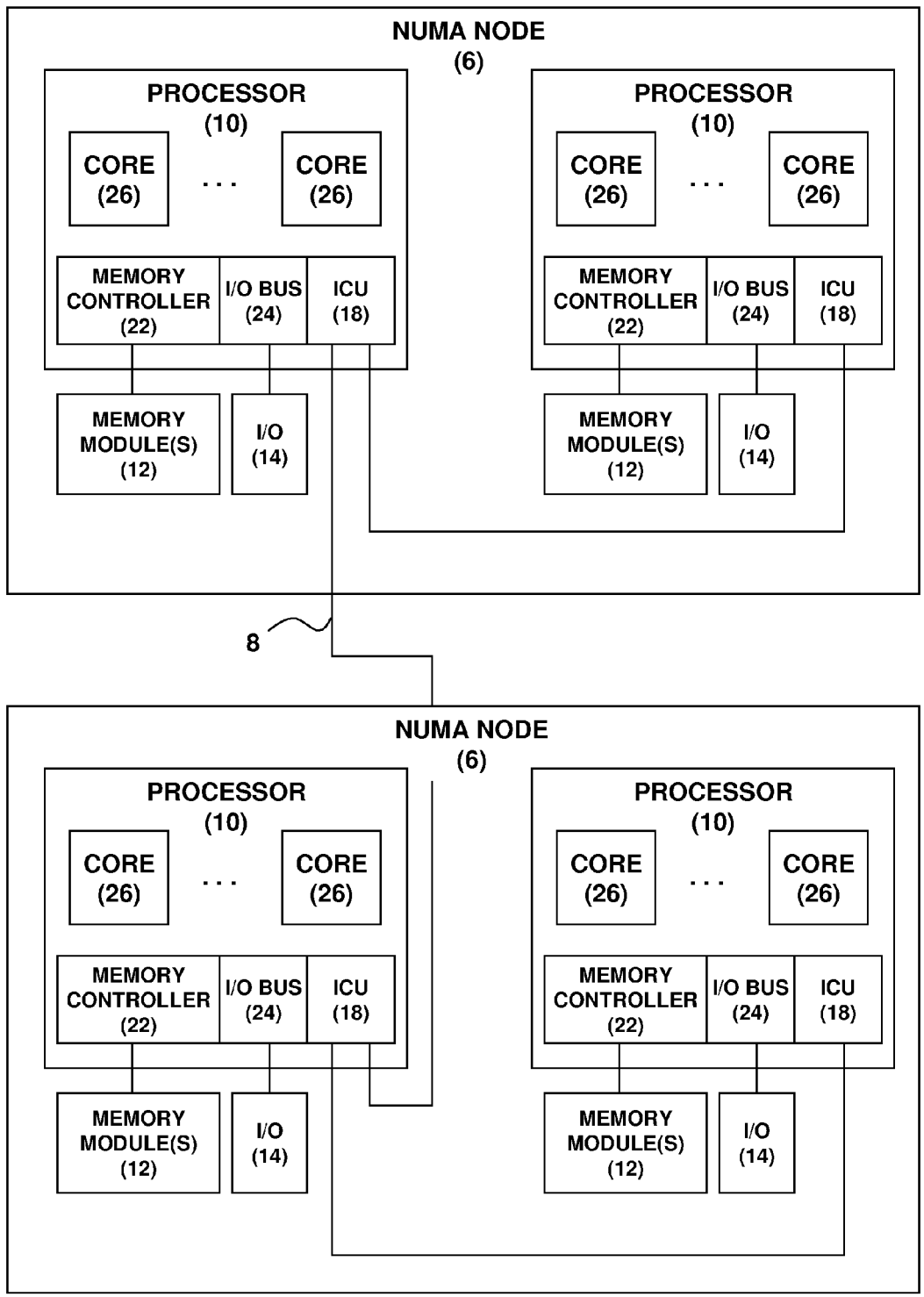
FIG. 3 is a functional block diagram showing another example configuration of the NUMA machine hardware of FIG. 1.

FIG. 3 illustrates another example of a localized configuration of the NUMA machine hardware 4. In this configuration, each node comprises a circuit board that mounts two (or more) processors 10 and a set of one or more memory modules (e.g., DIMM modules) that provide the node local memory circuitry 12. Each processor 10 in FIG. 3 corresponds to a CPU 10 of FIG. 1. The processors 10 may have single or multiple cores 26. As in FIG. 2, the circuit boards that mount each node's processors 10 and memory modules 12 may be located within a single server, or they may respectively reside in separate servers that are interconnected. The I/O controller 14 and the interconnect unit 18 may be implemented in the manner described above in connection with FIG. 2. In addition to the internodal communication links between the NUMA nodes 6 that provide the internodal communication system 8, there are intranodal communication links between the processors 10 within each node. As in FIG. 2, the memory controller 22 and the I/O interface 24 may be co-located with the processor.

Figure 4:
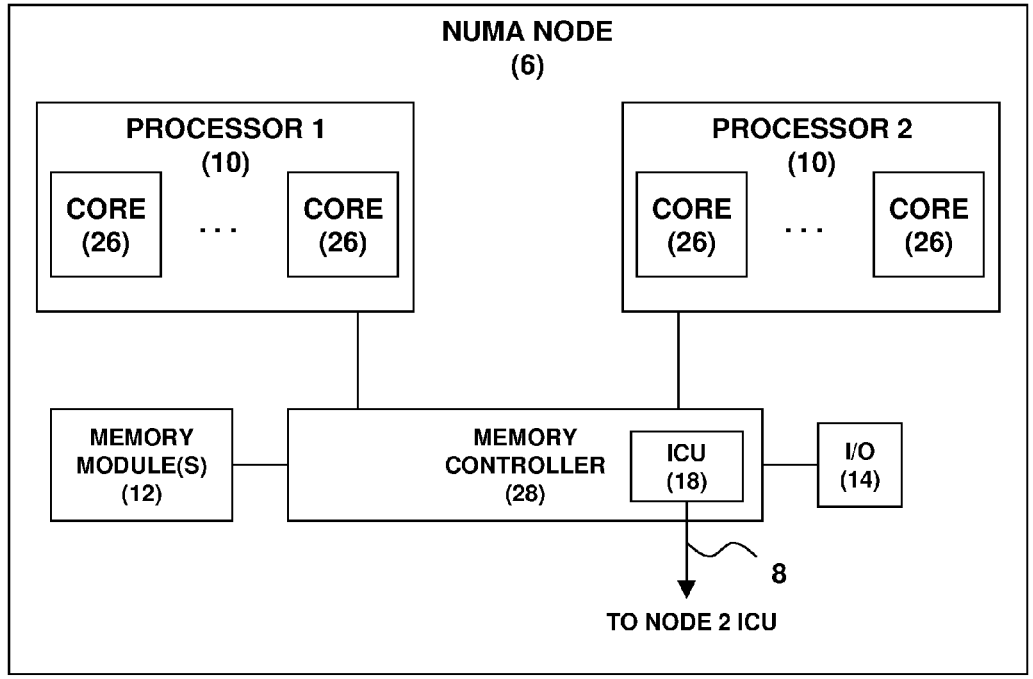
FIG. 4 is a functional block diagram showing another example configuration of the NUMA machine hardware of FIG. 1.
Figure 4:
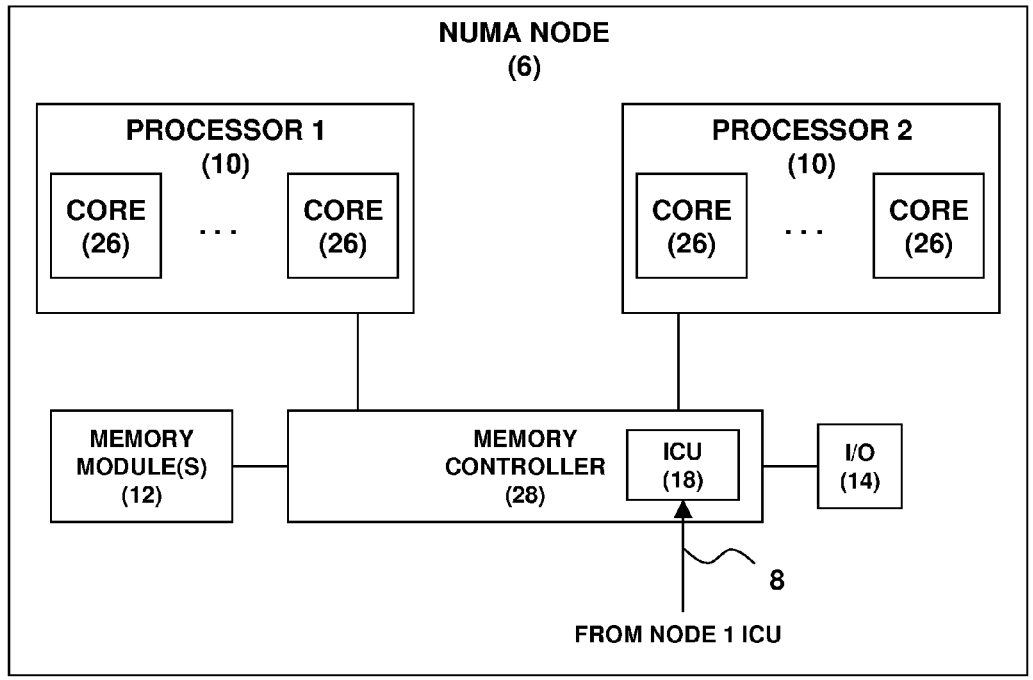

FIG. 4 illustrates a further example of a localized configuration of the NUMA machine hardware 4, again comprising a pair of NUMA nodes 6 that each have two (or more) processors 10 with single or multiple cores. As in the case of the immediately preceding example of FIG. 3, each processor 10 of FIG. 4 corresponds to a CPU 10 of FIG. 1. In this example, however, it is shown that the interconnect unit 18 may situated within an off-processor memory controller 28 that connects to the processor 10 via a front side memory bus. An example memory controller circuit that may be used to provide such an interconnect unit 18 is the Hurricane 4™ memory controller used in servers of the IBM® System x® product line. This hardware would support an internodal communication system 8 comprising IBM® System x® Server scalability port links. The I/O controller 14 may be connected to the memory controller 28 (e.g., as a conventional South bridge or I/O controller hub).

Figure 5:
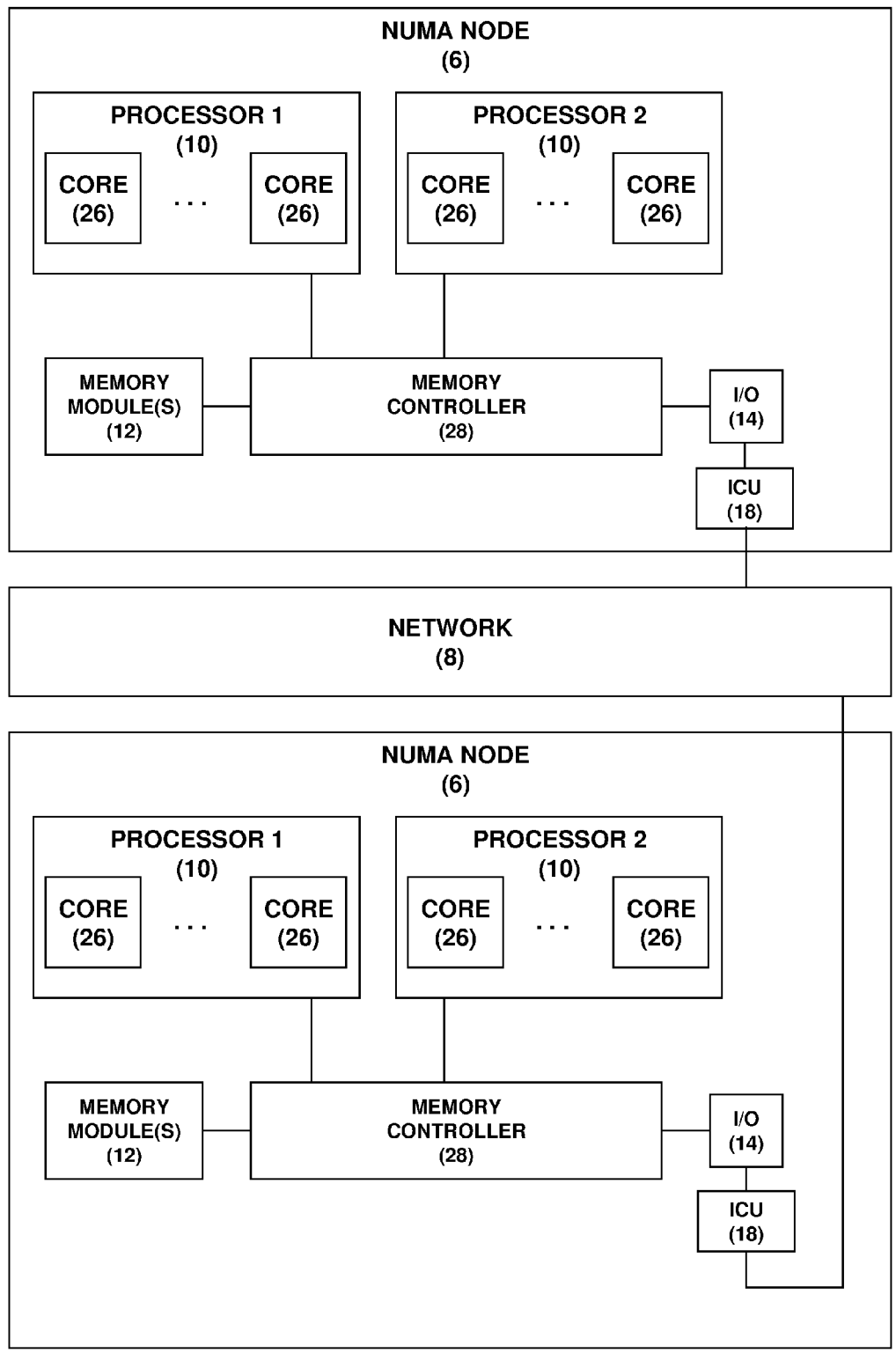
FIG. 5 is a functional block diagram showing another example configuration of the NUMA machine hardware of FIG. 1.

FIG. 5 illustrates an example of a non-localized configuration of the NUMA machine hardware 4. In this configuration, the NUMA machine hardware 4 may be implemented as a distributed shared memory server cluster. The ICU 18 is provided by a conventional network interface adapter (e.g., a network interface card) connected to the I/O controller 14. The internodal communication system 8 is provided by a network that could be packet or circuit switched, or could include a combination of packet switched and circuit switched portions. Example network topologies include local area networks, wide area networks, metropolitan area networks, intranets, extranets, and a global network such as the Internet. Distributed memory sharing could be provided using conventionally known software techniques, such as virtual memory demand paging. It will be appreciated that the latency differentials between local and remote memory or I/O accesses will typically be larger for a NUMA configuration such as FIG. 5 as compared to the configurations of FIGS. 2-4.

Figure 6:
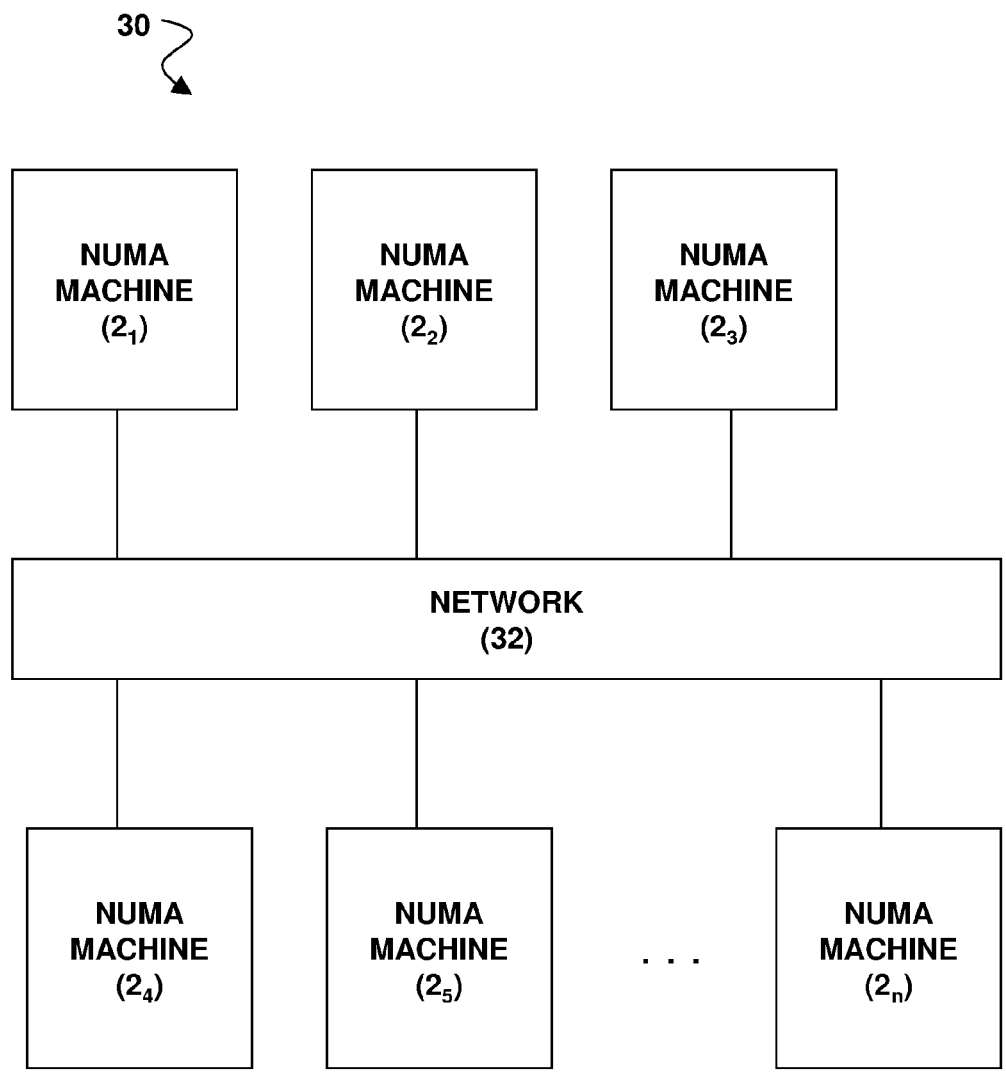
FIG. 6 is a functional block diagram showing a cloud or cluster of the NUMA machines of FIG. 1.

Turning now to FIG. 6, a cloud or cluster 30 of NUMA machines may be implemented using plural instances $2_1$, $2_2 \ldots 2_n$ of the NUMA machine 2 shown in FIG. 1. The NUMA machines $2_1, 2_2 \ldots 2_n$ are interconnected by a conventional network 32 of any suitable type. For this embodiment, example network topologies may again include local area networks, wide area networks, metropolitan area networks, intranets, extranets, and a global network such as the Internet. As described in more detail below, the cloud or cluster 30 may be used to support dynamic partition migration in accordance with the present disclosure.

Returning now to FIG. 1, a partition manager 40 operates within the NUMA machine 4 to provide a set of logical partitions 42 (shown individually as partitions $42_1$, $42_2 \ldots 42_n$). The logical partitions 42 provide corresponding hardware environments 44 (shown individually as hardware environments $44_1$, $44_2 \ldots 44_n$ and software environments 46 (shown individually as software environments $46_1$, $46_2 \ldots 36_n$) for running various application workloads 48 (shown individually as application workloads $48_1$, $48_2 \ldots 48_n$). Except to the extent it is modified to provide dynamic logical partition management in accordance with the present disclosure, the partition manager 40 may be implemented using conventional technology. This technology may be implemented by way of software, firmware, dedicated logic circuitry, or a combination of the foregoing, operating in conjunction with the NUMA machine hardware 4.

For example, the partition manager 40 may be implemented using a conventional virtual machine monitor (VMM) or hypervisor. Well known examples of commercial VMMs include, but are not limited to, the dynamically configurable PowerVM® virtualization system available in IBM® System p® server products. As is conventionally known, a VMM provides a low level service that virtualizes the underlying hardware to provide a subset of CPU, memory and I/O resources (i.e., a virtual machine partition) on behalf of higher level "guests." A VMM embodiment of the partition manager 40 will thus provide the hardware environments 44 of the partitions 42 by allocating CPU bandwidth, memory and I/O resources from the NUMA nodes 6 of the NUMA machine hardware 4. Within the partitions 42, the application workloads 48 will behave as if they were running on separate hardware systems that each comprise the assigned hardware resources.

Each the software environments 46 may include associated operating system instances (not shown) that support the application workloads 48. The partition manager 40 may then interoperate between such operating systems and the bare NUMA machine hardware 4. This is known in the art as whole system-level virtualization, with each partition representing a virtual machine that executes a separate operating system instance. Alternatively, the partition manager 40 could itself be implemented by an operating system and the software environments 46 could comprise application containers. This is known in the art as operating system-level virtualization.

The partition manager 40 supports conventional dynamic logical partitioning, meaning that the partitions 42 can be dynamically reconfigured at run time. This may be accomplished by adding unallocated hardware resources to partitions, removing hardware resources from partitions and returning them to unallocated status, or by moving hardware resources between partitions. The hardware resources that may be allocated among the partitions 42 include the CPUs (or CPU timeslices if micro-partitioning is supported), memory and I/O resources within any of the NUMA nodes 6 of FIGS. 1-5. For virtualization products such as the IBM® PowerVM® system, dynamic logical partitioning further includes the ability to migrate partitions across NUMA machines within a cloud or cluster of NUMA machines. Thus, in the NUMA machine cloud or cluster 30 of FIG. 6, the partitions 42 could be migrated between any of the NUMA machines $2_1, 2_2 \ldots 2_n$.

A technique for dynamically managing partitions according to NUMA considerations is described in more detail below. First, however, it will be instructive to address why such dynamic partition management can be beneficial in a NUMA environment. In particular, FIGS. 7-9 will be used to explain why partitioning in a NUMA machine can be affected by whether the partitions cross node boundaries, and why repartitioning to reduce (or increase) the level of node boundary crossing may be beneficial.

Figure 7:
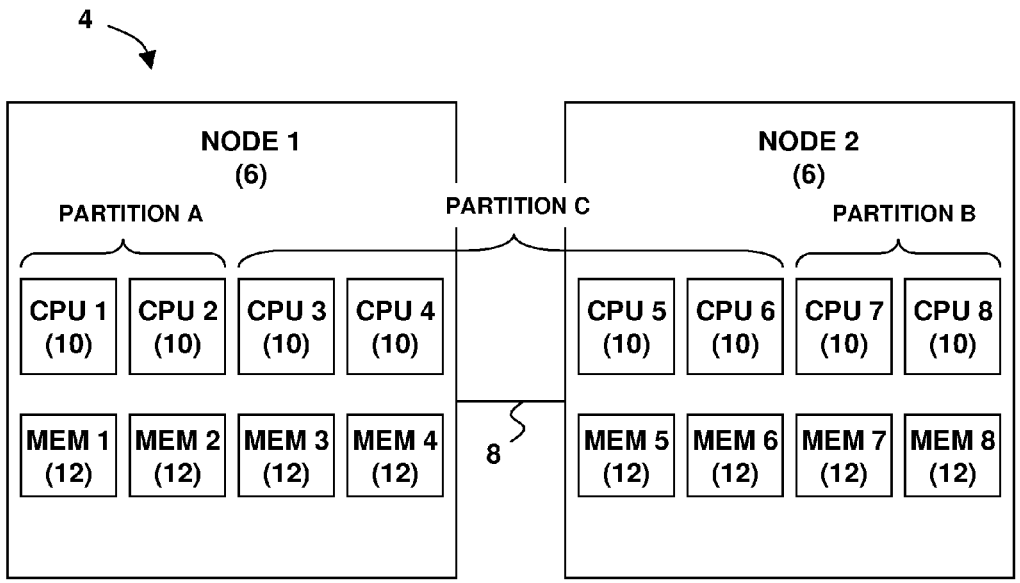
FIG. 7 is a functional block diagram showing an example logical partition configuration in the NUMA machine of FIG. 1.
Figure 8:
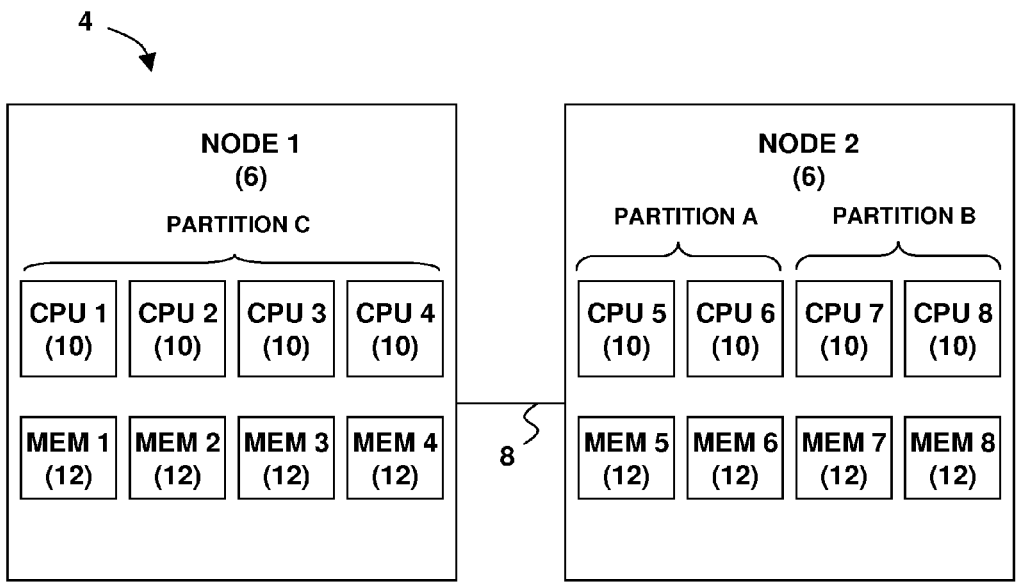
FIG. 8 is a functional block diagram showing a first example reorganization of the logical partition configuration in the NUMA machine of FIG. 1.

As a practical example, consider FIG. 7 wherein two of the NUMA nodes 6 of FIG. 1 are shown. Assume that these two nodes (Node 1 and Node 2, respectively) each have four CPUs 10 (CPUs 1-4 on Node 1 and CPUs 5-8 on Node 2). Assume further that each node has four memory address range assignments (MEMs 1-4 on Node and MEMs 5-8 on Node 2). Note that MEMs 1-4 and 5-8 could correspond to an equal number of individual memory modules. Alternatively, each MEM 1-4 and 5-8 could require less than or more than the address space of one memory module. If a two-processor/two-memory circuit partition (Partition A) is established using CPUs 1/2 and MEMs 1/2 in Node 1, and then another two-processor/two-memory circuit partition (Partition B) is established using CPUs 7/8 and MEMs 7/8 in Node 2, the resultant partitioned machine may be in an optimized state. Each partition will be on its own NUMA node making only local memory accesses. However, if a new four-processor/four-memory circuit partition (Partition C) is added, it will have to be assigned CPUs 3/4 and MEMs 3/4 of Node 1 and CPUs 5/6 and MEMs 5/6 of Node 2. Partition C will cross node boundaries. In particular, CPUs 3/4 of Node 1 may need to access MEMs 5/6 of Node 2, and CPUs 5/6 of Node 2 may need to access MEMs 3/4 of Node 1. Moreover, CPUs 5/6 may need to access an I/O device (not shown in FIG. 7) on Node 1. The increased latency arising from such remote memory and I/O accesses across the internodal communication system 8 may cause Partition C to run slowly. Thus, as shown in FIG. 8, it may be desirable to reconfigure the partitions by migrating Partition A to Node 2 so that Partition C can be reconstituted entirely on Node 1. Partition A will now comprise CPUs 5/6 and MEMs 5/6 on Node 2, and Partition C will comprise CPUs 1/2/3/4 and MEMs 1/2/3/4 on Node 1. Partition C will no longer have make internodal memory and I/O accesses, which may improve its performance.

One the other hand, a complicating factor is that the optimal partition layout is often workload dependent. In particular, depending on how an application workload accesses memory and I/O resources, it is possible that memory and I/O access bandwidth is more important than the latency of memory and I/O accesses for the application. As used herein, latency refers to the time required to service memory and I/O access requests. This quantity includes the amount of time that a CPU takes to put the request on the processor bus, and the time it takes to transfer the request to a memory or I/O controller through the cache hierarchy, satisfy the request, and return the data to the CPU that requested the data. Bandwidth refers to the rate at which data is transferred between a CPU and a memory circuit or I/O device.

For an application workload that makes bursty asynchronous memory and I/O requests, latency may be the predominant determinant of memory and I/O subsystem performance. These types of operations will usually not saturate memory and I/O bus pathways, such that access requests can be handled as they are issued. This favors local access requests within a node because they can be handled with lower latency than remote requests to other nodes. The opposite may be true for workloads that stream large amounts of data between CPUs and memory circuits and I/O devices. In this environment, local memory and I/O bus pathways can quickly saturate, resulting in a reduction in bandwidth and an increase in effective latency. Offloading the memory and I/O requests to other nodes may make sense in this scenario. Even though the latency is higher for the remote requests, the internodal communication system 8 will provide one or more additional pathways to memory and I/O resources, thereby alleviating bandwidth problems on the local node and increasing memory and I/O throughput. Even though the latency of accessing the memory and I/O resources on remote nodes may be higher, the increased bandwidth may allow the application workload to complete its work faster than if all memory and I/O accesses were restricted to one node.

Figure 9:
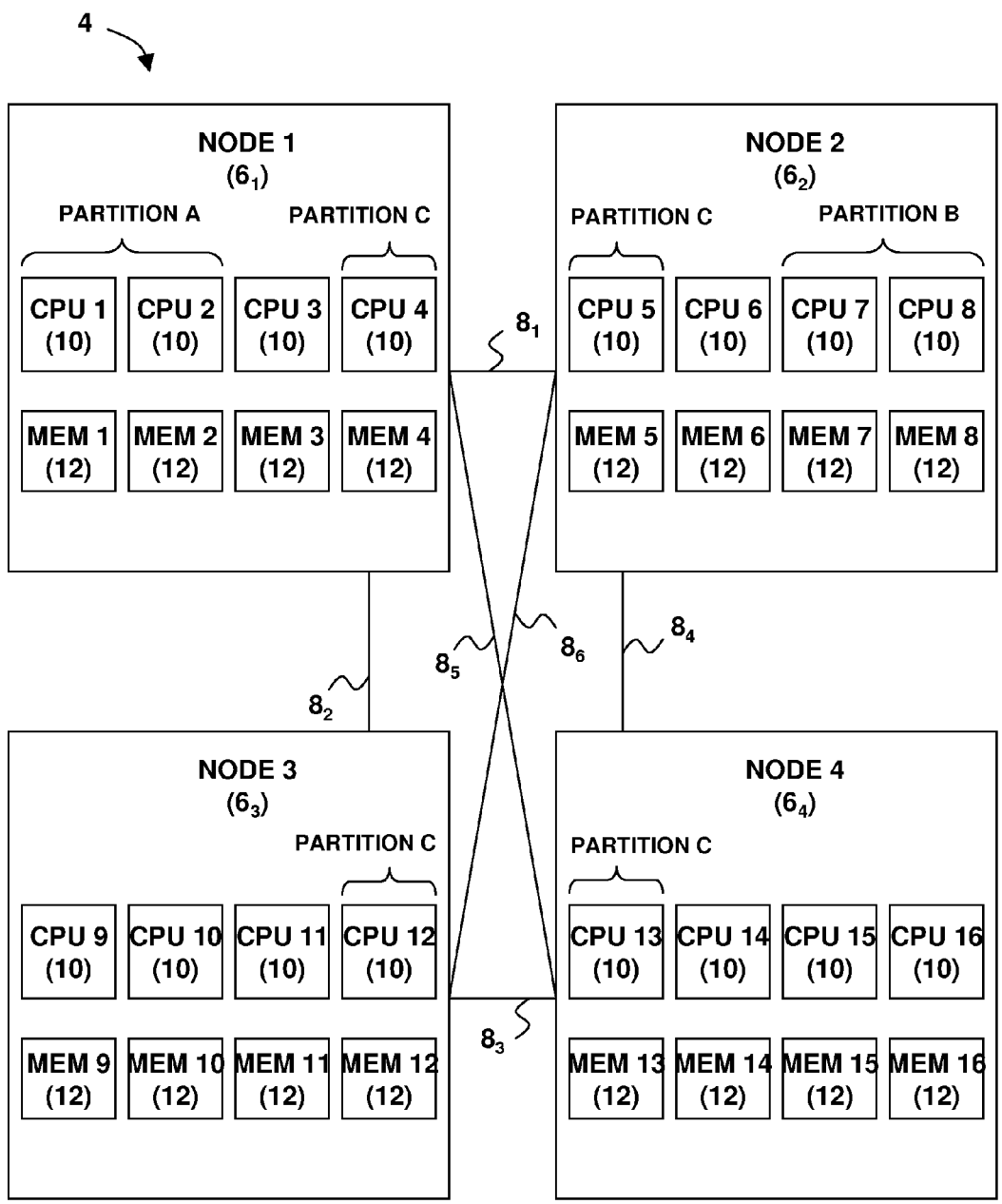
FIG. 9 is a functional block diagram showing a second example reorganization of the logical partition configuration in the NUMA machine of FIG. 1.

FIG. 9 is illustrative. In this example, instead of consolidating Partition C on Node 1, the partition is distributed over four CPUs and four MEMs on four separate nodes, namely, CPU 4 and MEM 4 on Node 1, CPU 5 and MEM 5 on Node 2, CPU 12 and MEM 12 on Node 3 and CPU 13 and MEM 13 on Node 4. The CPUs of Partition C will be required to make internodal memory and I/O requests in order to access all of the partition's memory and I/O resources. However, there will be six internodal links $8_1, 8_2 \ldots 8_6$ that may be used to handle the data transfer bandwidth. This can greatly improve performance for bandwidth sensitive application workloads.

Figure 10:
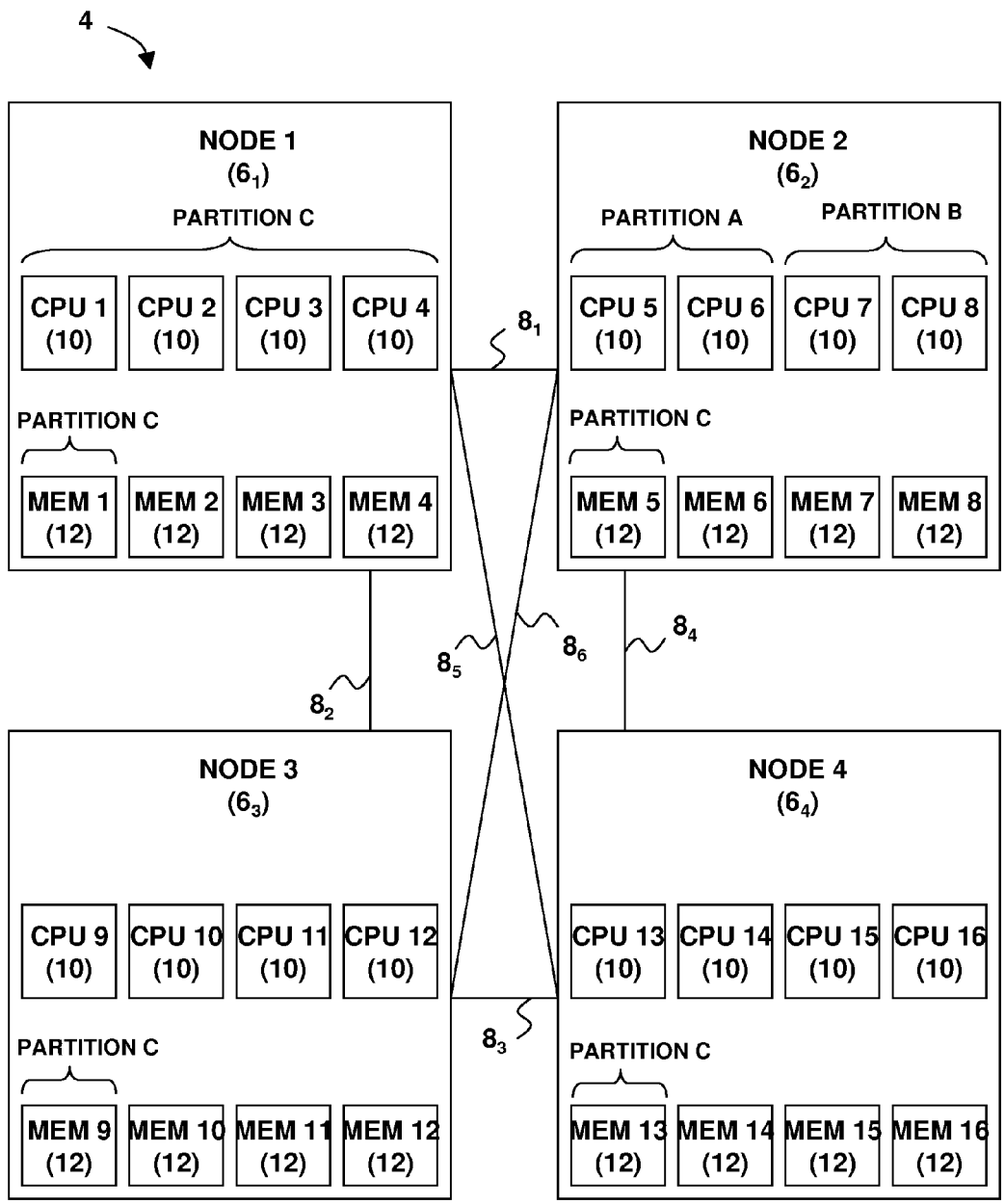
FIG. 10 is a functional block diagram showing a third example reorganization of the logical partition configuration in the NUMA machine of FIG. 1.

As an alternative to the configuration of FIG. 9, another way to increase internodal memory and I/O access bandwidth would be to redistribute only the partition memory (or I/O resources). An example is shown in FIG. 10. Here, the CPUs of Partition C (CPUs 1/2/3/4) are all on Node 1, but the memory address space is distributed over Nodes 1-4 as MEM 1, MEM 5, MEM 9 and MEM 13. Again, the CPUs of Partition C will be required to engage in internodal communication in order to access all of the partition's memory, but bandwidth will increase due to the availability of plural internodal links carry the memory and I/O traffic. Note, however, that Partition C in FIG. 10 will only use three internodal communication links $8_1, 8_2$ and $8_5$ instead of the eight links used in FIG. 9, and thus may not be an optimal configuration.

Figure 11A:
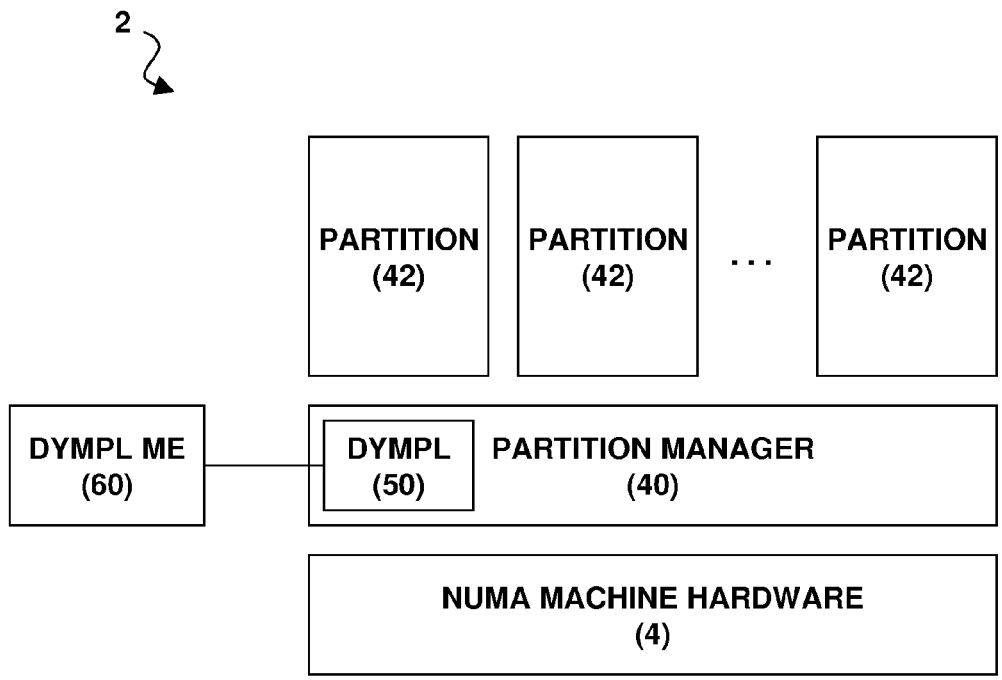
FIG. 11A is a functional block diagram showing one configuration of a dynamic manager of partition layout.
Figure 11B:
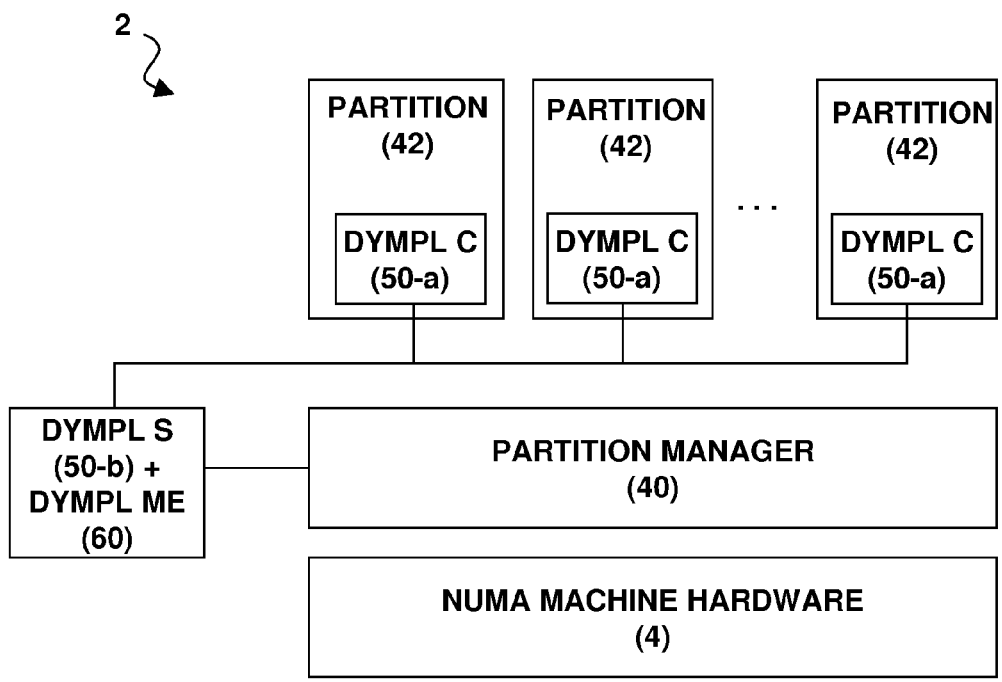
FIG. 11B is a functional block diagram showing another configuration of a dynamic manager of partition layout.

Turning now to FIGS. 11A and 11B, the optimization of partition configuration to achieve a proper balance between latency and bandwidth is provided by a logic entity 50 that may be referred to as a DYMPL, which stands for DYnamic Manager of Partition Layout. As shown in FIG. 11A, the DYMPL 50 may be implemented in whole or in part as a component of the partition manager 40. A DYMPL Management InterfacE, the DYMPL ME 60, may be provided for administrative control of the DYMPL 50. The DYMPL ME 60 may execute on the NUMA machine hardware 4, or it may operate on a separate machine, such as a workstation, that is connected to the NUMA machine hardware, as by a network connection. As shown in FIG. 11B, the DYMPL 50 may also be implemented using a client server model. According to this configuration, a DYMPL client, the DYMPL C 50-*a*, resides in each partition 42 and communicates with a DYMPL server, the DYMPL S 50-*b*. The DYMPL S 50-*b* may operate on the same hardware as the DYMPL ME 60, and may be part of the DYMPL ME itself.

In both FIGS. 11A and 11B, the DYMPL 50 and the DYMPL ME 60 may be implemented by way of software, firmware, dedicated logic circuitry, or a combination of the foregoing, operating with the NUMA machine hardware 4, and possibly also with the above-mentioned workstation or other separate machine. For example, the DYMPL 50 may be constructed by modifying existing logical partition management software products to perform the partition management functions described herein. Examples of such software include, but are not limited to, the IBM® Partition Load Manager (PLM), the IBM® Global Resource Manager (GRM), and the IBM® enterprise Workload Manager (eWLM), all of which may be used with IBM® System p® servers. The foregoing products are variously designed to support dynamic partition reconfiguration without human intervention. They have the ability to monitor conditions within running partitions, such as CPU load, memory availability, and I/O resource utilization, and then automatically invoke a partition manager, such as the IBM® PowerVM® virtualization system, to balance such resources according to partition requirements. Such products, however, do not currently support the ability to dynamically manage partitions based on NUMA considerations, which is why they merely serve as a starting point for implementing NUMA-aware partition management as disclosed herein. The DYMPL ME 60 may also be implemented using exiting products, including but not limited to the IBM® Hardware Management Console (HMC) used to control the IBM® PowerVM® system in IBM® System p® servers. The HMC provides a user interface for managing dynamic logical partitioning by allowing administrators to manually perform dynamic logical partition reconfiguration.

As described in more detail below, the DYMPL 50 operates in cooperation with the dynamic partitioning logic of the partition manager 40. Together, the DYMPL 50 and the partition manager 40 ensure that the partitions 42 are dynamically and automatically managed at runtime based on the monitoring of local and remote memory and I/O access latency and bandwidth in the NUMA machine hardware 4. In this way, the NUMA machine 2 may be transformed from a first partition layout state to a second partition layout state that is optimized for the application workloads 48 running on the partitions 42 according to whether a given partition will most efficiently execute within a single one of the NUMA nodes 6, or by spanning across one or more node boundaries. The DYMPL 50 monitors the latency and bandwidth saturation on memory and I/O pathways within the various partitions 42. This information allows the DYMPL 50 to determine if latency or bandwidth is more important to the application workload 38. After determining that a partition 42 needs to change, the DYMPL 50 may invoke the dynamic partitioning logic of the partition manager 40 to dynamically reassign CPUs 10 (or CPU timeslices if micro-partitioning is supported), address space portions of the memory circuits 12, and I/O resources 16 to relieve any saturated pathways. The DYMPL 50 will thus dynamically manage the partitions 42 by characterizing a partition's relative memory and I/O access latency and bandwidth dependencies and initiate adjustment of the partition layout configuration.

In the configuration of FIG. 11A, the monitoring and decision making functions of the DYMPL 50 are performed within the partition manager 40. In the configuration of FIG. 11B, each DYMPL C 50-*a* monitors and reports latency and bandwidth information for its own partition to the DYMPL S 50-*b*. The DYMPL S 50-*b* processes the information and makes the necessary partition management decisions.

The DYMPL 50 may support dynamic partition management through a combination of partition reconfiguration and, if necessary, partition migration. In partition reconfiguration, the CPU, MEM and I/O resources of a partition, such as Partition C of FIGS. 7-10, are reassigned so that the partition spans a different number of nodes. In partition migration, all of the CPU, MEM and I/O resources of a partition, such as Partition A of FIGS. 7 and 9, are migrated from one NUMA node 6 to one or more other NUMA nodes in order to make room for another partition. Partitions that are migrated are preferred to be migrated within the same NUMA machine when there is room, or on other NUMA machines if there is no local room. In the latter case, the other NUMA machines would normally be part of an interconnected group of NUMA machines, such as the NUMA cloud or cluster 30 of FIG. 6. The dynamic partition management supported by the DYMPL 50 may also include prioritizing partitions relative to each other. This allows the partition layout to be optimized to degrade the performance of a relatively low priority partition and increase the performance of a relatively high priority partition.

Figure 12:
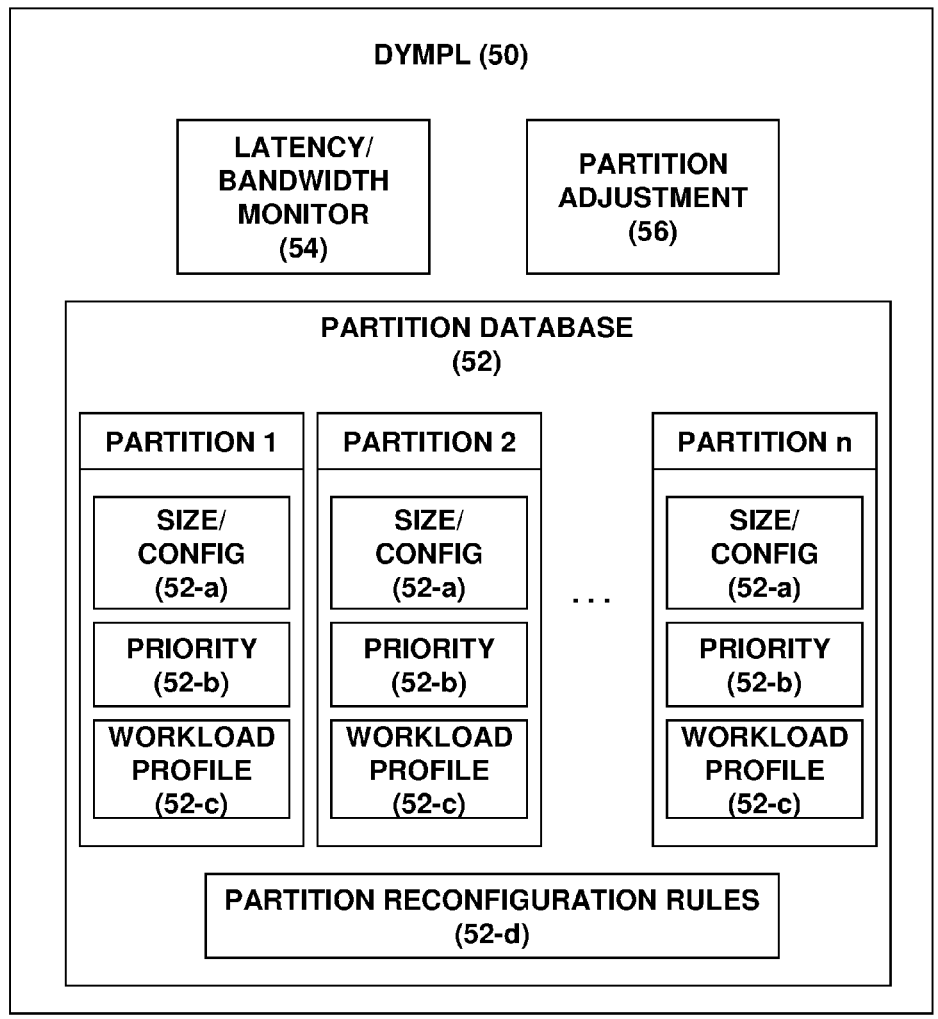
FIG. 12 is a functional block diagram showing example components of a dynamic manager of partition layout.

FIG. 12 illustrates an example configuration of the DYMPL 50 that includes a partition database 52, a latency/bandwidth monitor 54, and a partition adjustment component 56. The partition database 52 may be implemented as a lightweight database that is within (or external to) the partition manager 40. Its purpose is to maintain partition information that is used for dynamic partition management at runtime and to persist that information across reboots. The partition information stored by the partition database 52 may include partition size and configuration information 52-a, such as the number of CPUs, MEMs and I/O resources assigned to the partition, and their NUMA node locations. The partition database information may also include a partition priority value 52-b, such as a number from 0-5 where 0 represents the highest priority and 5 represents the lowest priority (or visa versa). Partition priority can be based on business considerations within an enterprise, and may be used when a tradeoff needs to be made between the performance of different partitions. For example, partition priority may be used to identify partitions 42 that can be migrated to make room for other partitions. In addition, when the DYMPL 50 is optimizing partition layout, it can make a choice to degrade performance of a lower priority partition (by reconfiguring that partition) if the change would increase performance of a higher priority partition. The partition database 52 may also store partition workload profile information 52-c. By way of example, the workload profile information may include a set of memory latency and bandwidth thresholds that a partition 42 must provide for optimum execution of the application workloads 38.

The latency/bandwidth monitor 54 is the logic of the DYMPL 50 that tracks the memory and I/O access latency and bandwidth for the partitions 42 running on the NUMA machine hardware 4. The latency and bandwidth information can be obtained in various ways, including but not limited to, by consulting conventional CPU performance counters of the type found in commodity processors. Information that can be tracked by such performance counters includes running counts of CPU memory and I/O transactions that may be used to determine memory and I/O latency and bandwidth congestion. Software-generated memory and I/O access statistics may also be used, including but not limited to information generated at the application or operating system level within the software environments 46, or within the partition manager 40.

The partition adjustment component 56 is the logic of the DYMPL 50 that interprets the runtime memory and I/O access latency and bandwidth information obtained by the latency/bandwidth monitor 54. Based on this information, the partition management component 56 makes determinations regarding activity on local memory and I/O busses, and on internodal communication links. It then invokes the dynamic partitioning logic of the partition manager 40 to perform responsive partition adjustments as necessary. As used herein, the term "partition adjustment" includes both partition reconfiguration and partition migration. These functions may be performed by periodically evaluating the monitored runtime information, such as by comparing the monitored information with the workload profile information 52-c maintained for each partition in the partition database 52. Alternatively (or in addition), the partition adjustment component 56 may be programmed to draw conclusions about partition latency and bandwidth by applying generalized partition reconfiguration policy rules to the monitored information. As shown in FIG. 12, such rules may be stored in the partition database 52 (see reference number 52-d), or in any other desired location. An example of such a rule would be a policy that favors all partitions 42 being confined to single NUMA nodes. Exceptions to such a policy could then be created, such as an exception allowing partitions 42 to span across two or more NUMA nodes if the increased bandwidth provided by internodal communication links would increase memory throughput due to degraded memory access latency and bandwidth conditions on local busses. The partition adjustment component 56 may also consider the partition priority in making partition adjustments, as discussed above. When it is determined that a partition reconfiguration is required, the partition adjustment component 56 can request the partition manager 40 to reallocate CPUs, MEMs and I/O resources to or from the partition being adjusted. When it is determined that partition migration is required (usually to make room for another partition being considered for reconfiguration), the partition adjustment component can determine whether migration is possible due to CPU, memory and/or I/O resources being available on a different NUMA node. As mentioned above, partition priority may be taken into account for this operation. As also discussed, partitions can be migrated within a single NUMA machine 2, or across different NUMA machines within a group of interconnected NUMA machines, such as the NUMA cloud or cluster 30 of FIG. 6.

Figure 13:
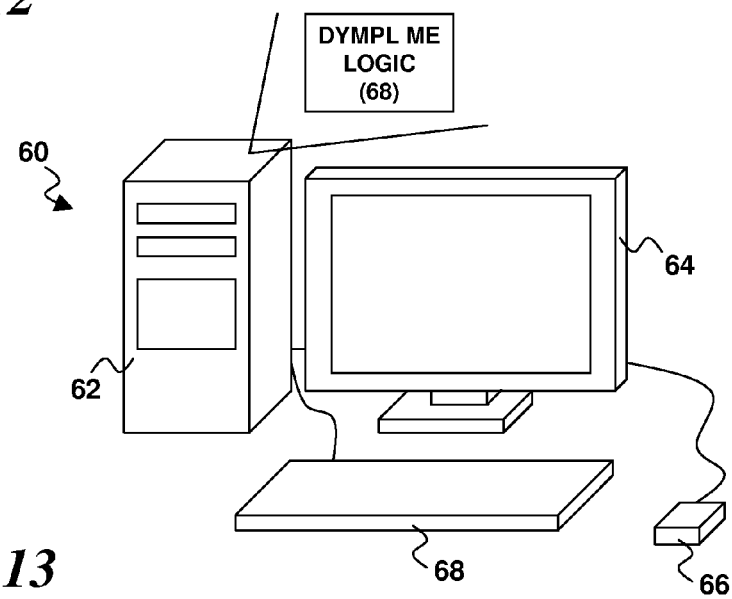
FIG. 13 is a perspective view of an example machine that may be used to provide a management interface for a dynamic manager of partition layout.

FIG. 13 illustrates example components of the DYMPL ME 60 that may be used by a human administrator to control the DYMPL 50. The illustrated components, which are shown diagrammatically and are not intended to represent specific physical device configurations, include a computer 62 (having one or more CPUs operatively coupled to a memory), an output device such as a display monitor 64, and input devices such as a mouse 66 and a keyboard 68. As discussed above in connection with FIGS. 11A and 11B, the computer 62 could be a standalone workstation that is networked to the NUMA machine hardware 4, or it could be part of the NUMA machine hardware 4. In the latter case, the DYMPL ME 60 may be assigned to a dedicated partition used for the DYMPL ME 60 and other administrative support entities. The computer 62 may be programmed with software or firmware logic 68 for controlling the computer to implementing the DYMPL ME functions. As an example of such functions, the DYMPL ME 60 may be used to populate the partition database 52 by specifying to the DYMPL 50 such information as partition size/configuration, priority, workload profile and partition reconfiguration policy rules. The DYMPL ME 60 may also be used to modify partition information during run time, to view partition performance, and to generate reports of partition activity for management purposes.

Figure 14:
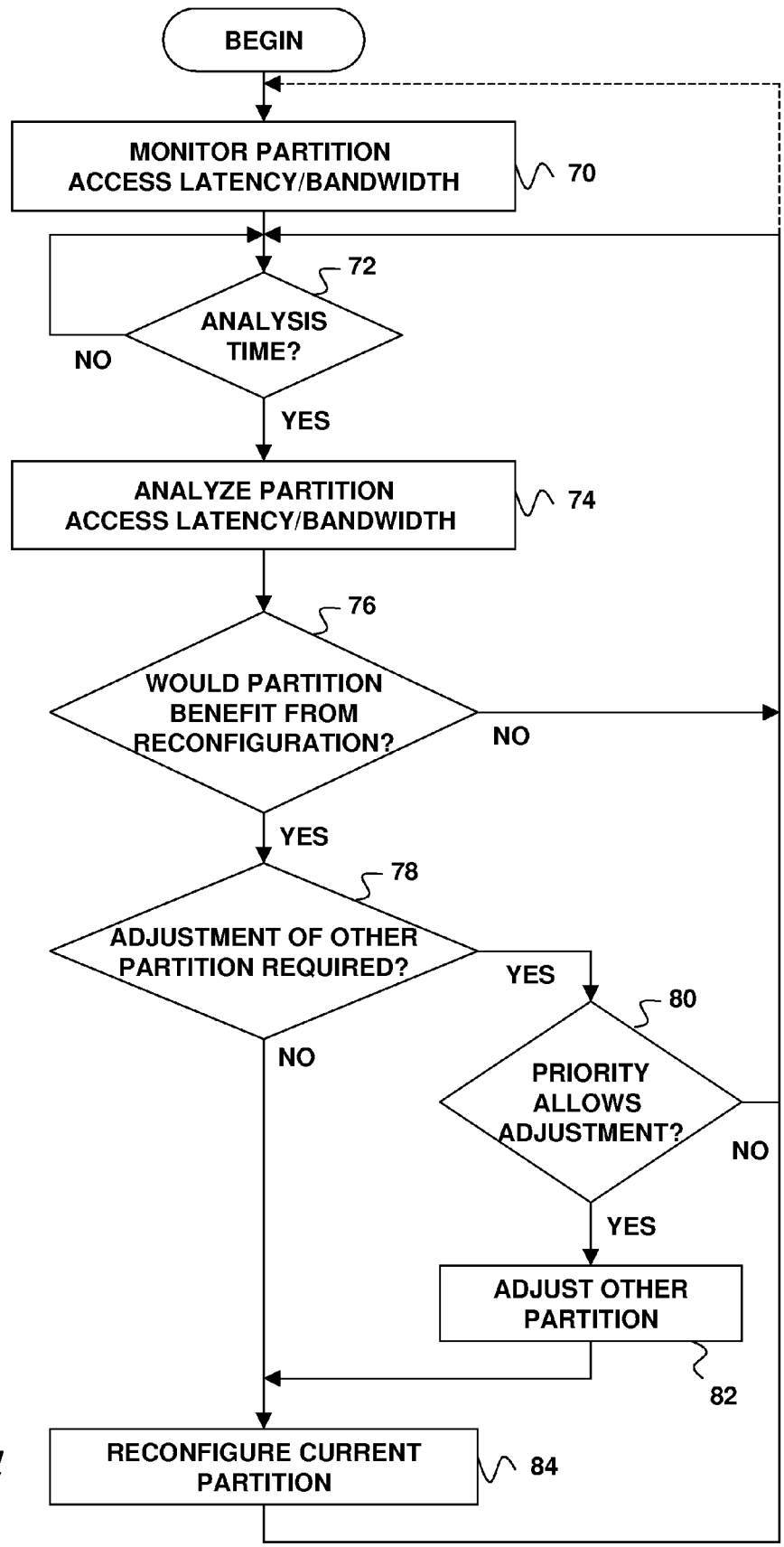
FIG. 14 is a flow diagram showing example operations for a dynamic manager of partition layout.

Turning now to FIG. 14, a flow diagram is set forth to show one possible set of example operations that may be performed by the DYMPL 50 to support automated dynamic partitioning operations at run time. It should be understood that these operations are set forth merely to illustrate general principles that may serve as a guide for implementation of the DYMPL 50. Persons skilled in the art will appreciate from the present disclosure that other operational scenarios may also be implemented in accordance with the present disclosure, and that the present disclosure is not limited to the precise partitioning operations shown in FIG. 14.

Prior to the operations of FIG. 14, the DYMPL 50 may initialize itself following system startup by opening the partition database 52. If sufficient memory is available, the partition information may be loaded into memory for improved performance. Alternatively, information lookups in the database may be made periodically as partition reconfiguration decisions are made.

In block 70, the DYMPL latency/bandwidth monitor component 54 begins gathering partition memory access latency and bandwidth information. Similar information for I/O resources access may also be monitored. Both local and internodal accesses may be monitored.

In block 72, the DYMPL partition adjustment component 56 loops or performs other processing until it determines that it is time to analyze the monitored information. The frequency and/or conditions under which information analysis will be performed can be based on parameters specified by an administrator via the DYMPL ME 60.

When block 72 produces a positive result, block 74 is implemented and the partition adjustment component 56 analyses the monitored access latency and bandwidth information. This can be done in many different ways, depending on design criteria. For example, as mentioned above, the partition adjustment component 56 may compare the monitored information to the workload profile information maintained in the partition database 52 to verify that workload goals are being met. Alternatively (or in addition), the monitored information may be evaluated using the above-described partition reconfiguration policy rules 52-d. As also indicated above, both local and remote accesses may be analyzed to assess latency and bandwidth conditions on both local busses and internodal links.

In block 76, the partition adjustment component 56 determines whether a partition 42 would benefit from partition reconfiguration, and if so, what kind. If the determination is that no reconfiguration is required, processing may return to block 72 so that another partition can be analyzed (or to block 70 so that further monitoring may be performed). If the determination is that reconfiguration would be beneficial, the partition adjustment component 56 determines from the analysis in block 74 what manner of reconfiguration is needed. It then initiates the reconfiguration, if possible, in the remaining blocks of FIG. 14.

The first step of the reconfiguration procedure is to determine in block 78 if reconfiguration of the current partition 42 (the first partition) requires an adjustment to be made to another partition (the second partition), either by migrating the second partition to another NUMA node or by reconfiguring it in some other manner that makes room for the first partition.

If it is determined in block 78 that adjustment of a second partition is required, the partition adjustment component 56 may implement block 80 to assess the relative priorities of the two partitions (assuming partition priority information is being maintained). If the first partition 42 does not have sufficient priority to warrant degrading the performance of the second partition, reconfiguration terminates and processing returns to block 72 so that another partition can be analyzed (or to block 70 so that further monitoring may be performed). If the first partition 42 is determined to have sufficient priority, the second partition is adjusted in block 82 as required to allow the first partition to be reconfigured.

In block 84, the partition adjustment component 56 requests the dynamic partitioning logic of the partition manager 40 to perform the partition reconfiguration that was recommended in block 76. Additional partitions 42 may then be evaluated for possible reconfiguration by returning to block 72. Alternatively, monitoring may be resumed by returning to block 70.

Accordingly, a technique for dynamic logical partition management for NUMA machines and clusters has been disclosed. It will be appreciated that the inventive concepts may be variously embodied in any of a machine apparatus, a machine-implemented method, and a computer program product in which digitally encoded program instructions are stored on one or more computer-readable data storage media for use in controlling a computer or other data processing machine to perform the required functions. The program instructions may be comprise machine language code that is ready for loading and execution by the machine apparatus, or the program instructions may comprise a higher level language that can be assembled, compiled or interpreted into machine language. Example high level languages include, but are not limited to assembly, C, C++, Java, to name but a few. When implemented on a machine comprising a CPU, the program instructions combine with the CPU to provide a particular machine that operates analogously to specific logic circuits, which themselves could be used for the invention.

Figure 15:
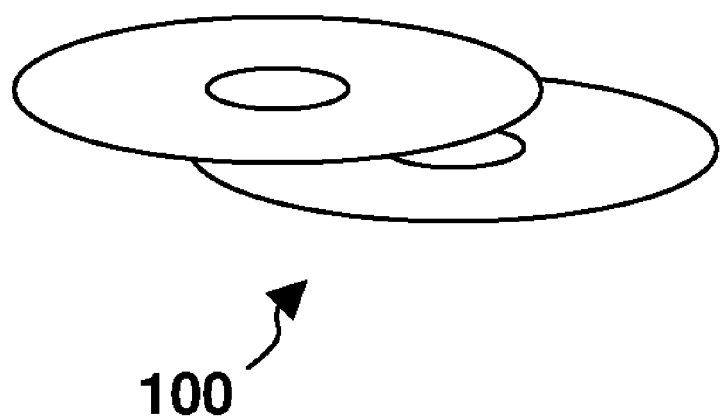
FIG. 15 is a diagrammatic illustration of computer-readable storage media that may be used to store program instructions for implementing dynamic logical partition management for NUMA machines and clusters.

Example data storage media for storing such program instructions are shown by reference numeral 100 in FIG. 15. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the program instructions of the invention either alone or in conjunction with an operating system, VMM or hypervisor or other software product that incorporates the required functionality. The media could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation or signaling medium, or other entity that can contain, store, communicate, propagate or transport the program instructions for use by or in connection with an instruction execution system, apparatus or device, such as a computer. For all of the above forms of media, when the program instructions are loaded into and executed by an instruction execution system, apparatus or device, the resultant programmed system, apparatus or device becomes a particular machine for practicing the inventive methods and systems as described herein.

Although several embodiments of the invention have been shown and described, it should be apparent that many variations and alternative embodiments could be implemented. It is understood, therefore, that the invention is not to be in any way limited except in accordance with the spirit of the appended claims and their equivalents.

What is claimed is:

1. A method for dynamically transforming a partition layout state in a partitioned NUMA (NonUniform Memory Access) machine based on NUMA considerations, comprising:
controlling a set of two or more operatively interconnected NUMA nodes to provide said NUMA machine;
each of said NUMA nodes comprising one or more CPUs and associated memory circuitry;
said NUMA nodes being operatively interconnected by one or more internodal communication links such that said CPU(s) on each NUMA node can access said memory circuitry on other NUMA nodes;
partitioning said NUMA machine to provide two or more logical partitions that each comprise an allocation of CPU resources and memory circuit resources on at least one of said NUMA nodes, and which respectively run at least one associated data processing application;
monitoring latency and bandwidth associated with accesses by said partition CPU resources to said partition memory circuit resources, including local accesses within said NUMA nodes and remote accesses between said NUMA nodes on said internodal communication links; and
dynamically managing said partitions at runtime based on said latency and bandwidth monitoring to transform said distributed data processing machine from a first partition layout state to a second partition layout state that is optimized for said data processing applications running on said partitions according to whether a given partition will most efficiently execute within a single NUMA node or by spanning across one or more NUMA node boundaries.

2. A method in accordance with claim 1 wherein said monitoring further includes monitoring latency and bandwidth associated with accesses by said partition CPU resources to input/output (I/O) resources at one or more of said NUMA nodes.

3. A method in accordance with claim 1 wherein said partitions are dynamically managed by migrating a partition from one NUMA node to another in order to prevent another partition from spanning across a NUMA node boundary.

4. A method in accordance with claim 1 wherein said partitions are dynamically managed by prioritizing partitions relative to each other and optimizing said partition layout configuration to degrade the performance of a relatively low priority partition and increase the performance of a relatively high priority partition.

5. A method in accordance with claim 1 wherein said partitions are dynamically managed by adjusting said partition layout configuration to increase a partition's NUMA node boundary crossings when doing so would boost partition performance by providing additional memory access bandwidth, and to reduce a partition's NUMA node boundary crossings when doing so would boost partition performance by decreasing memory access latency.

6. A method in accordance with claim 3 wherein said NUMA machine is part of a cloud or cluster of NUMA machines, and said partition migrating includes migrating a partition from one NUMA machine to another in said cloud or cluster.

7. A partitioned NUMA (NonUniform Memory Access) machine apparatus with a dynamically transformable partition layout state, comprising:
a set of operatively interconnected NUMA nodes providing said NUMA machine;
each of said NUMA nodes comprising one or more CPUs and associated memory circuitry;
said NUMA nodes being operatively interconnected by one or more internodal communication links such that said CPU(s) on each NUMA node can access said memory circuitry on other NUMA nodes;
said NUMA machine further including a computer-readable storage medium embodying at least one program of instructions executable by said CPUs to perform dynamic logical partition management based on NUMA considerations, comprising:
partitioning said NUMA machine to provide two or more logical partitions that each comprise an allocation of CPU resources and memory circuit resources on at least one of said NUMA nodes, and which respectively run at least one associated data processing application;
monitoring latency and bandwidth associated with accesses by said partition CPU resources to said partition memory circuit resources, including local accesses within said NUMA nodes and remote accesses between said NUMA nodes on said internodal communication links; and
dynamically managing said partitions at runtime based on said latency and bandwidth monitoring to transform said distributed data processing machine from a first partition layout state to a second partition layout state that is optimized for said data processing applications running on said partitions according to whether a given partition will most efficiently execute within a single NUMA node or by spanning across one or more NUMA node boundaries.

8. An apparatus in accordance with claim 7 wherein said monitoring further includes monitoring latency and bandwidth associated with accesses by said partition CPU resources to input/output (I/O) resources at one or more of said NUMA nodes.

9. An apparatus in accordance with claim 7 wherein said partitions are dynamically managed by migrating a partition from one NUMA node to another in order to prevent another partition from spanning across NUMA nodes.

10. An apparatus in accordance with claim 7 wherein said partitions are dynamically managed by prioritizing partitions relative to each other and optimizing said partition layout configuration to degrade the performance of a relatively low priority partition and increase the performance of a relatively high priority partition.

11. An apparatus in accordance with claim 7 wherein said partitions are dynamically managed by adjusting said partition layout configuration to increase a partition's NUMA node boundary crossings when doing so would boost partition performance by providing additional memory access bandwidth, and to reduce a partition's NUMA node boundary crossings when doing so would boost partition performance by decreasing memory access latency.

12. An apparatus in accordance with claim 9 wherein said NUMA machine is part of a cloud or cluster of NUMA machines, and said partition migrating includes migrating a partition from one NUMA machine to another in said cloud or cluster.

13. A computer program product for dynamically transforming a partition layout state in a partitioned NUMA (NonUniform Memory Access) machine based on NUMA considerations, comprising:

one or more computer-readable storage media;
program instructions stored on said one or more media for programming a data processing machine, as by:
controlling a set of two or more operatively interconnected NUMA nodes to provide said NUMA machine;
each of said NUMA nodes comprising one or more CPUs and associated memory circuitry;
said NUMA nodes being operatively interconnected by one or more internodal communication links such that said CPU(s) on each NUMA node can access said memory circuitry on other NUMA nodes;
partitioning said NUMA machine to provide two or more logical partitions that each comprise an allocation of CPU resources and memory circuit resources on at least one of said NUMA nodes, and which respectively run at least one associated data processing application;
monitoring latency and bandwidth associated with accesses by said partition CPU resources to said partition memory circuit resources, including local accesses within said NUMA nodes and remote accesses between said NUMA nodes on said internodal communication links; and
dynamically managing said partitions at runtime based on said latency and bandwidth monitoring to transform said distributed data processing machine from a first partition layout state to a second partition layout state that is optimized for said data processing applications running on said partitions according to whether a given partition will most efficiently execute within a single NUMA node or by spanning across one or more NUMA node boundaries.

14. A computer program product in accordance with claim 13 wherein said monitoring further includes monitoring latency and bandwidth associated with accesses by said partition CPU resources to input/output (I/O) resources at one or more of said NUMA nodes.

15. A computer program product in accordance with claim 13 wherein said partitions are dynamically managed by migrating a partition from one NUMA node to another in order to prevent another partition from spanning across NUMA nodes.

16. A computer program product in accordance with claim 13 wherein said partitions are dynamically managed by prioritizing partitions relative to each other and optimizing said partition layout configuration to degrade the performance of a relatively low priority partition and increase the performance of a relatively high priority partition.

17. A computer program product in accordance with claim 13 wherein said partitions are dynamically managed by adjusting said partition layout configuration to increase a partition's NUMA node boundary crossings when doing so would boost partition performance by providing additional memory access bandwidth, and to reduce a partition's NUMA node boundary crossings when doing so would boost partition performance by decreasing memory access latency.

18. A computer program product in accordance with claim 15 wherein said NUMA machine is part of a cloud or cluster of NUMA machines, and said partition migrating includes migrating a partition from one NUMA machine to another in said cloud or cluster.

19. A method for dynamically transforming a partition layout state in a partitioned NUMA (NonUniform Memory Access) machine based on NUMA considerations, comprising:
controlling a set of two or more operatively interconnected NUMA nodes to provide said NUMA machine;
each of said NUMA nodes comprising one or more CPUs and associated memory circuitry;
one or more of said NUMA nodes comprising an input/output (I/O) resource;
said NUMA nodes being operatively interconnected by one or more internodal communication links such that said CPU(s) on each NUMA node can access said memory circuitry and I/O resources on other NUMA nodes;
partitioning said NUMA machine to provide two or more logical partitions that each comprise an allocation of CPU resources and memory circuit resources on at least one of said NUMA nodes, and which respectively run at least one associated data processing application;
said partitioning further including assigning one or more of said I/O resources to one or more of said logical partitions;
dynamically managing said partitions at runtime to transform said distributed data processing machine from a first partition layout state to a second partition layout state that is optimized for said data processing applications running on said partitions according to whether a given partition will most efficiently execute within a single NUMA node or by spanning across one or more NUMA node boundaries; and
said optimizing being based on consideration of memory and I/O access latency and bandwidth in said distributed data processing machine;
said partitions being dynamically managed by migrating a partition from one NUMA node to another in order to prevent another partition from spanning across a NUMA node boundary;
said partitions being further dynamically managed by prioritizing partitions relative to each other and optimizing said partition layout configuration to degrade the performance of a relatively low priority partition and increase the performance of a relatively high priority partition; and
said partitions being further dynamically managed by adjusting said partition layout configuration to increase a partition's NUMA node boundary crossings when doing so would boost partition performance by providing additional memory or I/O access bandwidth, and to reduce a partition's NUMA node boundary crossings when doing so would boost partition performance by decreasing memory or I/O access latency.

20. A method in accordance with claim 19 wherein said NUMA machine is part of a cloud or cluster of NUMA machines, and said partition migrating includes migrating a partition from one NUMA machine to another in said cloud or cluster.

* * * * *